United States Patent [19]

Stroke

[11] 4,133,689

[45] Jan. 9, 1979

[54] SUBMICRON BETA SILICON CARBIDE POWDER AND SINTERED ARTICLES OF HIGH DENSITY PREPARED THEREFROM

[75] Inventor: Frederick G. Stroke, McMurray, Pa.

[73] Assignee: PPG Industries, Inc., Pittsburgh, Pa.

[21] Appl. No.: 904,704

[22] Filed: May 10, 1978

Related U.S. Application Data

[63] Continuation of Ser. No. 637,342, Dec. 3, 1975, abandoned.

[51] Int. Cl.$^2$ ............................................. C04B 35/56
[52] U.S. Cl. ...................................... 106/44; 264/65; 423/275; 423/346
[58] Field of Search .................. 106/44; 423/346, 266, 423/275, 291

[56] References Cited

U.S. PATENT DOCUMENTS

| | | | |
|---|---|---|---|
| 2,908,553 | 10/1959 | Frank | 423/275 |
| 3,839,542 | 10/1974 | Chase et al. | 423/346 |
| 3,853,566 | 12/1974 | Prochazka | 106/44 |
| 3,960,577 | 6/1976 | Prochazka | 106/44 |
| 3,979,500 | 9/1976 | Sheppard et al. | 423/346 |
| 4,004,934 | 1/1977 | Prochazka | 106/44 |

FOREIGN PATENT DOCUMENTS

| | | | |
|---|---|---|---|
| 1184739 | 1/1965 | Fed. Rep. of Germany | 423/346 |
| 2449662 | 4/1975 | Fed. Rep. of Germany. | |

OTHER PUBLICATIONS

Alliegro, R. A. et al., "Pressure–Sintered Silicon Carbide", J. Am. Cer. Soc. 39 (11), 386-389, (1956).

*Primary Examiner*—Helen McCarthy
*Attorney, Agent, or Firm*—Irwin M. Stein

[57] ABSTRACT

Shaped silicon carbide ceramic articles of high density, e.g., at least 90 percent of theoretical, are produced by cold pressing and sintering boron-containing high purity, submicron beta silicon carbide powder. The silicon carbide powder is produced preferably by gas phase reaction of silicon halide, e.g., silicon tetrachloride, carbon source reactant, e.g., halogenated hydrocarbon, and boron source reactant, e.g., boron trichloride, with a hydrogen plasma.

11 Claims, No Drawings

SUBMICRON BETA SILICON CARBIDE POWDER AND SINTERED ARTICLES OF HIGH DENSITY PREPARED THEREFROM

This is a continuation of application Ser. No. 637,342, filed Dec. 3, 1975, now abandoned.

DESCRIPTION OF THE INVENTION

For many years, it has been known that silicon carbide has outstanding mechanical and physical properties; but, it has also been appreciated that these properties are realized only in a continuous silicon carbide matrix with little or no porosity. Silicon carbide powder is not easily self-consolidated to a density approaching theoretical. While high densities can be achieved by the simultaneous application of very high pressures and temperatures, e.g., pressures greater than 20 kilobars and temperatures above 2000° C., the limitation of such a process to relatively simple shapes and high cost inherent in such a forming process and any required subsequent machining step has been a deterrent to utilization of silicon carbide as a high temperature ceramic.

It is known that the pressure and temperature required for hot pressing silicon carbine can be reduced with the aid of small additions of elements such as aluminum, iron and boron, or compounds thereof, to the silicon carbide. See for example the articles, "Pressure-Sintered Silicon Carbide" by R. A. Alliegro et al., J. Amer. Ceram. Soc. 39(11), 386–389 (1956), and "The Preparation and Some Properties of Materials on the Base of Silicon Carbide with Boron and Aluminum Additions" by N. D. Antonova et al., Sov. Pow. Met. and Met. Ceram., No. 6, pp. 444-449 (1962). U.S. patents that describe silicon carbide-boron carbide compositions include U.S. Pat. Nos. 2,108,794, 2,329,085, 2,964,823 and 3,520,656. For example, U.S. Pat. No. 2,108,794 recites, "The addition of small percentages of boron carbide to silicon carbide makes possible the fusion of the material under conditions where silicon carbide itself cannot be fused" (Column 6, lines 19–22). A lightning arrester valve of silicon carbide and one percent boron carbide is described in U.S. Pat. No. 2,329,085.

The literature describes a variety of methods for preparing silicon carbide. A widely reported commercial process for preparing silicon carbide is the reaction of sand and coke in a high temperature furnace. This process produces principally the alpha or hexagonal crystal forms of silicon carbide and yields a reaction mass that must be milled extensively and then screened to obtain a granular powder. Preparation of silicon carbide by reaction of a vaporizable silicon compound and a hydrocarbon in the presence of hydrogen in the vapor phase has been described in U.S. Pat. Nos. 2,952,598, 3,340,020, 3,399,980, 3,508,954 and 3,755,541. It is reported that the vapor phase reaction yields principally the beta or cubic crystal form of silicon carbide. However, U.S. Pat. Nos. 3,340,020 describes the preparation of alpha silicon carbide by this method. Finally, U.S. Pat. No. 3,271,109 describes the preparation of pigmentary silicon carbide of the beta crystal form by the reaction of silicon oxide and carbon.

It has now been discovered that boron-containing submicron, beta silicon carbide powders which are especially useful, notably because of their ability to be cold pressed and sintered into silicon carbide articles having high densities, e.g., at least 90 percent of theoretical, can be produced by reacting a vaporizable compound of silicon, i.e., a silane such as silicon tetrachloride, a volatile source of boron, e.g., a boron halide, and a volatile source of carbon, e.g., a halogenated hydrocarbon, in a hot hydrogen stream produced by heating hydrogen in a plasma generator. The hot hydrogen stream is often referred to as a hydrogen plasma. Substantially all, i.e., at least 90 percent of the particles that make up the powder have an equivalent spherical diameter less than one micron. The preponderant number, i.e., greater than 50 percent, of the particles less than one micron are in the particle size range of between 0.05 and 0.7 microns. Moreover, X-ray diffraction analysis of the silicon carbide powder indicates that it is substantially all of the beta (cubic) crystal form. Only traces of alpha silicon carbide can be detected in the powder. Based on the sensitivity of the measuring instrument, it is believed that less than 1 weight percent of the powder is of the alpha crystal form.

Submicron, beta silicon carbide powder can also be produced containing (iron or aluminum as the) densification aid (dopant) by introducing into the hot hydrogen stream a suitable vaporizable compound of such elements, e.g., a halide thereof, along with the volatile source of silicon and carbon. Boron is preferred as the densification aid. Boron is not only an excellant dopant; but, is most conveniently employed because its halide, e.g., the trichloride, is more volatile than the corresponding iron or aluminum compounds. When silicon carbide is produced in this manner, the carbide of the dopant's cation (for example boron carbide) is believed to be coproduced or coformed in submicron size and homogeneously distributed throughout the silicon carbide product. Consequently, a truly homogeneous blend of a multicomponent system is produced. By virtue of such homogeneous distribution, more efficient use of the dopant results. Consequently, the level of dopant required to achieve a desired level of densification is less when the dopant is coformed than when the dopant is physically blended with pre-formed silicon carbide.

The boron-containing submicron, beta silicon carbide powder produced by the process described herein is unique as evidenced by its ability to be effectively processed by cold forming and sintering techniques. It has been found that this powder can be formed into simple and complex silicon carbide shapes possessing densities approaching theoretical by conventional cold pressing and sintering, i.e., pressure-less sintering, techniques. Thus, through the use of silicon carbide of the type produced by the process herein described it is possible to prepare shaped ceramic silicon carbide articles of high density, e.g., at least 90 percent of the theoretical density of silicon carbide, by using the more conventional ceramic cold forming techniques followed by sintering such shaped articles under vacuum or atmospheric pressure in a conventional high temperature furnace. Further, a relatively small amount of boron dopant is required to achieve such high densities with the above-described silicon powder carbide. As little as 0.17 weight percent boron has been found to promote densification of silicon carbide to levels of at least about 90 percent of theoretical. Moreover, as little as 0.24 weight percent boron has been found to promote densification to levels of at least about 98 percent of theoretical.

The boron-containing, submicron beta silicon carbide powder prepared in accordance with the process described herein can be cold pressed and sintered to produce dense ceramic articles which retain substantially the beta crystal form. This characteristic of the above-described silicon carbide powder is beneficial for the reason that alpha crystals in the sintered article are considered strength limiting. Consequently, a dense article, the microstructure of which is of the beta crystal form has the potential for achieving higher strength than an article in which the microstructure is of the alpha form. Further, the grain size of such sintered articles is fine grained and uniform and not coarse. This is believed to be a result of the submicron size of the starting powder, which is capable of being sintered at a temperature low enough so that crystal growth is quite moderate.

The uniqueness of the submicron beta silicon carbide powder described herein is believed to be attributable to one or more of the properties described hereinafter. The silicon carbide particles that comprise the powder product are substantially all submicron in size. Very few of the particles are greater than 1 micron. Moreover, a large percentage of the particles are within a fairly narrow size range, e.g., between 0.05 and 0.7 microns. Further, the silicon carbide crystals are well formed with well developed faces.

The aforesaid silicon carbide powder is of high purity. Because of the manner in which it is prepared, oxygen contamination is typically below 0.5 percent, more usually less than 0.4 percent. Since oxygen is reported to inhibit densification, control of the oxygen level in the silicon carbide is essential. The process for preparing the silicon carbide powder described herein is especially advantageous because it permits controlling oxygen contamination at very low levels.

The level of free carbon (chemically uncombined carbon) in the silicon carbide powder can also be controlled at low levels because of the process used to prepare the powder. Thus, free carbon levels of 2 weight percent or less, e.g., 1.5 or 1.0 weight percent or less, are capable of being achieved. A small amount of free carbon in the silicon carbide powder is reported to be beneficial since it may act as a scavenger for oxygen or elemental silicon that may be present in the powder. The amount of other metallic elements (other than boron, which is intentionally added) present in the silicon carbide powder is also low. Commonly, less than 1000, e.g., 800 parts of other metallic elements per million parts of silicon carbide powder, are present in the silicon carbide powder. Such elements include: iron, aluminum, tungsten, copper, molybdenum, calcium, magnesium, titanium, manganese and vanadium.

The aforesaid silicon carbide powder is substantially all of the beta (cubic) crystal form. It is reported that the beta to alpha transformation is promoted by the presence of the alpha crystal forms. Consequently, the above-described beta silicon carbide powder is capable of being sintered to silicon carbide shaped articles having predominantly the beta crystal form.

The boron-containing compound that serves as the densification aid is homogeneously dispersed throughout the silicon carbide powder with which it is coproduced. As indicated, the boron-containing compound promotes densification at relatively low temperatures, e.g., 1850°–2150° C. thereby aiding the preparation of a dense ceramic article having the beta crystal form-high temperatures favoring the transformation of the beta to alpha crystal forms.

Finally, it has been found that non-doped submicron beta silicon carbide powder can be densified to at least 90 percent of its theoretical density by blending with it coproduced boron-containing submicron beta silicon carbide in amounts such that the amount of boron present in the mixture is at least about 0.20 percent. For example, about 74 parts of submicron beta silicon carbide containing about 0.27 percent coproduced boron was blended throughly with about 26 parts of submicron beta silicon carbide substantially free of boron (<0.01%). This powder blend (the boron content of which was about 0.20 percent) was isostatically pressed and sintered to a density of about 96 percent of theoretical.

DETAILED DESCRIPTION

The present invention relates to submicron beta silicon carbide powder containing minor densifying amounts of coformed boron-containing additive, e.g., boron carbide, the process for producing such powder, and consolidated dense articles prepared from such silicon carbide powder. The amount of boron-containing additive utilized in the submicron beta silicon carbide powder described herein is a densifying amount, i.e., sufficient to obtain a densities by cold pressing and sintering techniques of at least 85, preferably at least 90 and, more preferably at least 95 percent of theoretical. Typically, the amount of boron-containing additive, calculated as percent elemental boron, varies between about 0.15 and about 4 weight percent. As used herein, the term "boron-containing additive", unless otherwise defined, is intended to mean boron present as elemental boron, chemically combined boron, e.g., boron carbide, or both. It is believed from the evidence at hand that with as little as 0.15 weight percent of boron densities of at least about 85 percent of the theoretical density of silicon carbide, i.e., 3.21 grams/cc., may be obtained by cold pressing and sintering techniques. At boron levels of between about 0.15 and about 0.20 weight percent, e.g., 0.17 weight percent, densities of at least 90 percent of theoretical can be obtained; and, with from about 0.20 to about 0.25 percent boron, densities of at least 95, e.g., 98 percent of theoretical are obtained by such forming techniques. Boron concentrations have 0.25 weight percent, e.g., between 0.3 and 3 or 4 weight percent can be used. A small amount of the boron-containing additive, e.g., up to 0.2–0.3 weight percent, appears by X-ray diffraction analyses to be in solid solution with the silicon carbide as evidenced by the absence of a separate phase. Boron concentrations above about 4 weight percent do not appear to offer any advantages with respect to densification to the use of lower concentrations and may be detrimental to the properties of the densified article. Consequently, the use of relatively low concentrations, from about 0.15 or 0.2 to about 1 or 2 weight percent, e.g., 0.15 or 0.2 to about 0.5 or 0.75 weight percent of boron, are preferred.

The submicron beta silicon carbide powder compositions of the present invention can be prepared by blending homogeneously coformed boron-containing submicron beta silicon carbide and submicron beta silicon carbide powder that is essentially boron-free. The boron-containing silicon carbide is used in an amount sufficient to provide in the total blend an amount of boron equal to the values described hereinbefore, i.e., in an amount equivalent to from about 0.15 to about 4 weight percent boron. Alternatively and preferably the boron-containing submicron beta silicon carbide powder is prepared by producing the boron-containing additive in situ during production of the silicon carbide powder. Various advantages accrue when the boron additive is introduced into the silicon carbide powder at that time. First, a more homogeneous distribution of boron in the silicon carbide powder product results than can be achieved by physically blending a boron additive with preformed silicon carbide. Second, it eliminates possible contamination of the silicon carbide with impurities that may be introduced during a blending procedure, and thirdly it avoids the possibility of producing non-homogeneous blends. Silicon carbide powder containing coproduced boron additive, i.e., boron additive formed simultaneously in the reactor with the silicon carbide, provides compositions in which the efficiency of the boron as a densifying aid is maximized. Consequently, less boron-containing additive is required to produce the same results as when a physical blend of, for example, silicon carbide and boron or boron carbide is used. It is postulated that the essentially homogeneous dispersion of reactor added boron and its submicron particles size is a major reason for this result.

As indicated, a preferred method for incorporating boron-containing additive in submicron beta silicon carbide powder is by coproducing the additive simultaneously with the silicon carbide powder. This is accomplished conveniently by introducing boron source reactant into the reactor wherein the silicon carbide powder is formed in amounts sufficient to obtain a boron concentration in the final powder product as described hereinbefore. Because of the nature of the process (described hereinafter) used for the preparation of submicron beta silicon carbide powder, it is believed that the boron-containing additive is present probably in the submicron silicon carbide as submicron boron carbide, e.g., $B_4C$. Further, because boron carbide is soluble to a limited extent in silicon carbide, a portion of the boron or boron carbide is probably in solid solution with the silicon carbide, i.e., to the limits of its solubility.

Among the boron source reactants that can be introduced into the reactor in which the silicon carbide is formed, there can be mentioned inorganic boron compounds such as boron tribromide, boron triiodide, boron trichloride, boron trifluoride, and the hydroborides (boranes), e.g., $B_2H_6$, $B_5H_9$, $B_{10}H_{14}$, and $B_6H_2$. Boron trichloride, $BCl_3$, is preferred. The boron source reactant should be substantially oxygen-free and substantially pure to avoid the introduction of oxygen and metal impurities into the silicon carbide powder product. By oxygen-free is meant that the boron source reactant is substantially free of chemically combined oxygen, e.g., the oxides of boron. The boron source reactant is introduced into the reactor in such a manner that it is present in the reaction zone as a vapor. It is chosen from those enumerated compounds of boron that react in a thermodynamically favorable manner with the silane and carbon source reactants at the chosen reaction temperature for the production of silicon carbide.

Generally, any readily volatile inorganic or organic silane can be used as the silicon source reactant in the preparation of submicron beta silicon carbide powder by the process described herein. As used herein, the term "silane" is intended to mean and include compounds containing silicon and elements selected from the group hydrogen, halogen, i.e., chlorine, bromine, iodine, and fluorine, hydrogen and halogen, and hydrogen, carbon and halogen. Silanes that can be used as the reactant include: the tetrahalosilanes, such as silicon tetrachloride, tetrabromide, and tetraiodide; the hydrosilanes (hydrosilicides), e.g., $SiH_4$, $Si_2H_6$, $Si_3H_8$, etc.

halogenated hydrosilanes, e.g., $SiH_3Cl$, $SiH_2Cl_2$, and $SiHCl_3$; and haloalkyl silanes, such as trihaloalkyl silanes, e.g., trichloromethyl silane. The tetrahalosilanes, such as silicon tetrachloride, are preferred. In the preparation of submicron silicon carbide containing coformed boron additive, it is preferred that the halogen of the silane is the same as the halogen of the boron source reactant, e.g., silicon tetrachloride and boron trichloride. The silanes also should be substantially pure, i.e. substantially free of metal contaminants and substantially free of chemically combined oxygen so as to produce silicon carbide powder relatively free of oxygen.

The carbon source reactant should also be readily volatile at the temperatures in the reaction zone and capable of reacting with the silane and boron source reactants in a thermodynamically favorable manner at the most favorable reaction temperature for the production of silicon carbide. Volatile hydrocarbons, halogenated hydrocarbons, or mixtures thereof that are substantially pure and substantially free of chemically combined oxygen can be used as the carbon source reactant. As used herein, the term "halogenated hydrocarbon", e.g., "chlorinated hydrocarbon", is intended to mean and include both the compounds of carbon, halogen, and hydrogen, and compounds only of carbon and halogen, e.g., carbon tetrachloride.

Typical of hydrocarbons that can be used as the carbon source reactant include the normally gaseous or liquid but relatively volatile hydrocarbons, including saturated and unsaturated $C_1$-$C_{12}$ hydrocarbons, such as methane, ethane, propane, the butanes, the pentanes, decanes, dodecanes, ethylene, propylene, the butylenes, and amylenes, symmetrical dimethylethylene and like alkenes; cycloaliphatic and aromatic hydrocarbons, such as cyclopentane, cyclohexene, cyclohexane, toluene, benzene, etc.; and acetylenic compounds of which may be noted acetylene, methyl acetylene, ethyl acetylene, and dimethyl acetylene. Rarely are hydrocarbons of more than 12 carbons used.

Examples of halohydrocarbons and halocarbon compounds that can be used as the source of carbon in the process described herein include saturated and unsaturated compounds containing from 1 to 12, more usually 1 to 8, carbon atoms. Examples include: methyl chloride, ethyl chloride, chloroform, carbon tetrachloride, dichlorodifluoromethane, n-propyl chloride, amyl chloride, vinyl chloride, 1,1-dichloroethylene, cis and trans 1,2-dichloroethylene, 1,1-dichloroethane, 1,2-dichloroethane, ethylene dibromide, trichloroethylene, perchloroethylene, propylene dichloride, 1,1,2-trichloroethane, 1,1,1-trichloroethane, 1,1,1,2- and 1,1,2,2-tetrachloroethane, hexachloroethane, and like aliphatic chlorides, fluorides, bromides, or iodides containing up to about 12 carbon atoms, most preferably up to about 6 carbon atoms. Aromatic halocarbon compounds, e.g., chlorocarbon compounds, also can be used. Such compounds include $C_6$-$C_9$ halogenated aromatic compounds such as monochlorobenzene, orthodichlorobenzene, paradichlorobenzene and the like. Cycloaliphatic halides such as the $C_5$-$C_6$ aliphatic halides, e.g., chlorinated cyclopentadiene, cyclohexylchloride, etc. can also be used. Preferably, the halogen of the halogenated hydrocarbon is the same as the halide of the silane and boron source reactants introduced into the reactor.

Typically, the above-described hydrocarbons and halogenated hydrocarbons should be readily vaporizable (volatile) without tar formation since otherwise unnecessary difficulties which are unrelated to the process itself can arise, such as plugging of lines by decomposition and/or polymerization products produced in the course of vaporizing these reactant materials. Use of hydrocarbons, solely as the carbon source reactant generally results in the production of very fine submicron silicon carbide and deposits of silicon carbide on exposed portions of the reactor apparatus adjacent to the reaction zone. Consequently, use of a hydrocarbon source reactant as the sole carbon source reactant is not preferred. Preferably, halogenated hydrocarbons or mixtures of hydrocarbons and halogenated hydrocarbons are used.

The amount of carbon source reactant used will preferably be in at least stoichiometric quantities, i.e., in an amount sufficient to provide at least 1 atom of carbon for each atom of silicon and 1 atom of carbon for each 4 atoms of boron introduced into the reaction zone of the reactor as the silane and boron source reactants. The atomic ratio of the carbon source reactant to the silane and boron source reactants can, of course, vary from stoichiometric quantities. Preferably, greater than the stoichiometric ratio is used for the reason that when a stoichiometric excess of the carbon source reactant is used, less residual unreacted silane and boron source reactants are found in the reactor effluent. The amount of carbon source reactant used in excess of stoichiometric should not be such as to produce large amounts of free carbon in the boron-containing silicon carbide powder product for the reason that too much free carbon in the submicron silicon carbide powder product can be detrimental and its removal requires extra processing of the product. When silicon carbide powder containing large amounts of free carbon is formed into shapes and sintered, the free carbon can appear as objectionable inclusions of carbon in the microstructure.

Typically, the amount of carbon source reactant should be controlled to obtain between about 0.05 and about 1.5 weight percent, e.g., between 0.1 and 1.0 weight percent, free carbon based on the silicon carbide powder product produced. Free carbon is the carbon present in the silicon carbide product as elemental carbon and not as chemically combined carbon, i.e., as silicon carbide (SiC) or boron carbides, e.g., $B_4C$. Free carbon in silicon carbide powder is reported to act as a scavenger for both oxygen and elemental silicon that may be present in the powder product or formed during sintering. As a scavenger for oxygen, i.e., a deoxidizer, the free carbon can react with oxygen (elemental or chemically combined, e.g., as SiO, $SiO_2$ or $B_2O_3$) at the sintering temperatures to produce carbon monoxide or carbon dioxide, thereby removing oxygen from the sintered article. Further, the free carbon can react with elemental silicon or boron under such conditions, as is well understood in the art to form, further silicon carbide or boron carbide. Both oxygen and elemental silicon are reported to hinder densification and consequently their removal may enhance densification to high densities. In particular, it has been proposed that an oxide layer, e.g., a silicon oxide layer, around silicon carbide particles forms a diffusion barrier which inhibits grain growth. Removal of the oxide layer by free carbon promotes sintering and controls grain growth.

Boron-containing silicon carbide powder prepared by the process described herein is a submicron powder that is comprised substantially of isometric cyrstals of beta-phase (as confirmed by X-ray diffraction analysis) silicon carbide which are bounded by a complex of crystal facets or irregular growth forms producing rounded but rough-surfaced particles. The particles are equant to sub-spherical in habit. The powder product is freely dispersible by virtue of limited particle intergrowth. Traces, perhaps up to one weight percent, of alpha polytypes of silicon carbide do occur with the beta phase. Better resolution of the amount of alpha polytypes is constrained by the sensitivity of the analytical technique used.

Submicron beta silicon carbide powders prepared in accordance with the process described are substantially free of undesirable metal contaminants, i.e., the powder is essentially pure, as established by emission spectrographic analysis.

Metal impurities (analyzed as elemental metal) normally represent less than 1000 parts per million parts of the silicon carbide powder (ppm), e.g., less than 0.1 weight percent, and often represent less than 800 ppm (0.08 weight percent). Among the metals that can comprise the aforementioned impurities are the following: iron, aluminum, calcium, magnesium, titanium, manganese, tungsten, copper, molybdenum, and vanadium. The source of such metal impurities, if present, in the silicon carbide powder product is normally the reactants or equipment used to prepare the product. Since boron is intentionally added, it is not considered an impurity.

Oxygen and halogen, e.g., chlorine, normally make up the largest individual non-metallic impurities that are introduced into the product from the reactants. By virtue of the process described herein, it is readily feasible to obtain silicon carbide powder with less than 0.20 weight percent halogen, e.g., chlorine, and less than 0.50, e.g., 0.40, weight percent oxygen. By careful recovery, e.g., degasification, techniques, silicon carbide powder with less than 0.15 often less than 0.10 weight percent halogen, e.g., chlorine; and less than 0.20 weight percent oxygen can be obtained. The aforementioned values for halogen and oxygen are based upon analysis for such impurities obtained by use of X-ray spectrographic analysis and by the use of a Lecon oxygen analyzer respectively. The aforementioned X-ray spectrographic technique analyzes principally for unreacted metal halides and subhalides present in the silicon carbide powder. Adsorbed hydrogen halide, e.g., hydrogen chloride, on the silicon carbide surface may not be detected by that technique.

Thus, despite the use of substantially pure reactants and careful handling and recovery techniques, a small amount of metal impurities, halogen and oxygen can be present in the silicon carbide powder product. Since boron and free carbon are intentionally present, such elements are not considered as impurities for purposes of this discussion. The total amount of the aforesaid impurities is usually less than about 1 weight percent. Stated another way, the silicon carbide powder is usually at least about 99 percent pure.

The boron-containing, beta silicon carbide powder produced by the process described herein is predominantly submicron in size. The surface area of the silicon carbide powder product produced thereby commonly varies between about 3 and about 15 square meters per gram ($m^2$/gram), more typically between about 4 and about 12 ($m^2$/gram), e.g., between 5 and 10 ($m^2$/gram), as measured by the method of Brunauer, Emmett, and Teller, *J. Am. Chem. Soc.*, 60, 309 (1938). This method, which is often referred as the B.E.T. method, measures the absolute surface area of a material by measuring the amount of gas adsorbed under special conditions of low temperature and pressure. The B.E.T. surface areas as reported herein were obtained using nitrogen as the gas adsorbed and liquid nitrogen temperatures ($-196°$ C.) and a pressure of 150 mm. of mercury (0.2 relative pressure). For particular cold forming techniques, e.g., injection molding, surface areas of between about 4 and 8 $m^2$/gram are preferred.

Substantially all, i.e., at least 90 percent by number of the silicon carbide particles comprising the silicon carbide powder are submicron, i.e., have an equivalent spherical diameter of less than one micron. The equivalent spherical diameter is the diameter of a sphere of equivalent volume formed by a Zeiss TGZ-3 Particle Size Analyzer and matched to the particle viewed under high magnification, e.g., 25,000 magnification, as viewed by an electron microscope and depicted in electron micrographs. The preponderent number, i.e., greater than 50 percent, of the particles less than 1 micron in size are in the particle size range between 0.05 and 0.7 microns. Particles as small as 0.03 microns and as large as 5 microns can be present in the powdery product; but, particles greater than 5 microns rarely represent more than 1 percent by number of the product. The aforesaid particles, less than 0.05 microns in size are distinguishable from ultrafine fragments less than 0.05 microns in size found in silicon carbide powder that has been milled extensively. The silicon carbide powder described herein is substantially free of fragments less than 0.1 micron, e.g., the ultrafine fragments less than 0.05 micron.

It is estimated from a study of the silicon carbide powders of the present invention with a Zeiss TGZ-3 particle size analyzer that at least 60 percent on a number basis, more usually at least 70 percent, e.g., 98 percent of the silicon carbide particles comprising the powder are 0.7 microns or less. It is not uncommon to find that the aforesaid percentages represent also the particles within the particle size range between 0.05 and 0.7 microns. It is estimated further that less than 15 percent on a number basis of the silicon carbide particles are greater than 1 micron. The aforementioned values respecting the percentage of carbide particles 0.7 microns or less depends on the particle size distribution of the powder. Generally, the particle size distribution is relatively narrow. The number mean particle size of the silicon carbide particles comprising the silicon carbide powder composition is usually between 0.08 and 0.8 microns, more usually between 0.15 and 0.4 microns and varies directly with the surface area of the powder.

Boron-containing, submicron beta silicon carbide powder of the present invention is prepared conveniently by vapor phase reaction of vaporizable silane compound, e.g., silicon tetrachloride, carbon source compound, e.g., halogenated hydrocarbon, and boron source compound, e.g., boron trichloride, in the presence of hydrogen using the equipment described in U.S. Pat. No. 3,761,576 and particularly FIG. 3 of that patent. Briefly, the equipment described in the aforementioned U.S. patent comprises plasma generator heating means mounted coaxially atop a reactant inlet assembly which, in turn, is mounted coaxially atop a reactor vessel. The solid reaction product is separated from the gaseous product effluent in cyclones and the solid product recovered in receivers connected to the cyclone separators.

In the operation of the aforesaid equipment, plasma gas, e.g., hydrogen, is passed through and heated by the plasma generator heating means. The highly heated plasma gas, e.g., a hot hydrogen plasma stream, is discharged from the plasma generator heating means as a highly heated gas stream and passes through the reactant inlet assembly. The reactants, e.g., silicon tetrachloride, boron trichloride and vinyl chloride are introduced into the highly heated gas stream from horizontal conduits vertically disposed within the inlet assembly and perpendicular to the heated gas stream. The reactants merge with the highly heated gas (hydrogen) stream and are forwarded into the reaction zone within the reactor where the formation of boron-containing, submicron beta silicon carbide occurs. The reactor effluent which comprises a gaseous suspension of solid silicon carbide particles, is withdrawn from the reactor and separated into its gaseous and solid portions, e.g., by cyclones, filters, etc., and the solid product recovered.

While the plasma generator heating means shown in FIG. 3 of U.S. Pat. No. 3,761,576 is a direct current arc heater, other plasma heater types, e.g., an induction (high frequency) heater, alternating current arc heater, or electrical resistance heater can also be used. The plasma gas is heated typically to a temperature which is sufficient to establish and maintain beta silicon carbide-forming temperatures in the reaction zone bearing in mind that the plasma gas is commonly mixed with silane, boron and carbon source reactants which are introduced commonly at below the reaction temperature, usually significantly below the reaction temperature. The heat content of the reactants can be taken into account in calculating the temperature required for the plasma gas. Typically the principal source of heat for the reaction is the plasma gas. In the production of silicon carbide by the aforementioned process and using hydrogen as the plasma gas, reaction temperatures in the principal reaction zone are calculated to be in the range of between about 2500° C. and about 3500° C.

Typically, hydrogen is used as the gas which is heated by the aforementioned plasma generator heating means, e.g., the plasma gas; while other gases, e.g., the noble gases such as argon and helium, can be used, especially useful silicon carbide powders have been prepared by use of a hydrogen plasma. A hydrogen plasma can have an enthalpy of between about 20,000 and 60,000 BTU's per pound of gas, more commonly between about 30,000 and 40,000 BTU's per pound. The use of hydrogen as a plasma gas is advantageous since it ensures the establishment of a reducing atmosphere and provides a halogen, e.g., chlorine, acceptor in the reaction zone thereby removing halogen released from the reactants, e.g., the tetrahalosilane, boron halide and, if used, the halogenated hydrocarbon reactants as hydrogen halide. Mixtures of hydrogen with other gases, such as the aforesaid noble gases, can also be used as the plasma gas. When a noble gas is used as the plasma gas, the hydrogen required to establish the aforementioned reducing atmosphere for the vapor phase reaction is introduced into the reactor with one or more of the reactants as a carrier gas, as a part of the reactants chemical structure, e.g., hydroborides, hydrosilane or hydrocarbon; and/or as a separate gas stream.

The amount of hydrogen utilized in the above-described process should be at least the amount which is required stoichiometrically to satisfy the theoretical demand as a halogen acceptor in the reaction. The theoretical demand of hydrogen is the amount necessary to combine with all of the halogen introduced into the reactor by the reactants to produce hydrogen halide, taking into account hydrogen available from other sources, e.g., the reactants, present in the reactor. Typically, the amount of hydrogen used is in excess of the theoretical amount. Often, the amount of hydrogen utilized will be from 2 to 10 times or more, the amount of theoretical hydrogen required for the reaction being conducted. Typically, the mole ratio of hydrogen to silane reactant, e.g., the tetrahalosilane, will range between about 20 and 40, e.g., 25, moles of hydrogen per mole of tetrahalosilane reactant.

The silicon, boron and carbon source reactants which are projected into the periphery of the highly heated plasma gas stream, e.g., the hot hydrogen stream, passing through the reactant inlet assembly, can be thus projected as a combined single stream or as two or more separate streams. If the reactants are combined for introduction into the reactor, they should be maintained well below reaction temperatures preceding their introduction to prevent premature reaction. Preferably, each of the reactants is introduced separately through its individual inlet conduit within the reactant inlet assembly.

The reactor shown in U.S. Pat. No. 3,761,576 is a recirculating type reactor as opposed to a plug flow type reactor. The apparent residence time of the reactants introduced into the reactor is between about 0.05 and about 0.5 seconds, more usually between 0.1 and 0.2 seconds. The apparent residence time is calculated by dividing the reactor volume by the gas flow through the reactor. The reactor and cyclone separators are typically cooled externally to provide cooling of the reactor and product effluent.

The silicon carbide powder product prepared in accordance with the aforementioned described process is a finely-divided powder that can adsorb gases, such as unreacted reactants that may be present in the receiver in which the silicon carbide is collected. To avoid contamination by adsorption, the receivers can be heated to temperatures above about 200° F. (93° C.), e.g., from 200° F.–600° F. (93° C.–316° C.) to assist in degassing of the product during collection. Simultaneously, it is advantageous to maintain a stream of hydrogen or chemically inert gas, e.g., a noble gas such as argon, percolating through the product to further assist in the degasification step. In the event the silicon carbide powder product contains adsorbed chlorine-containing species, e.g., halides of the silicon and boron halide reactants, such reactants can be removed by heating the product to between about 400° C. and 1000° C., e.g., 500° C.–700° C. and preferably about 600° C., for between about 1 and 4 hours. Following degasification, if employed, the silicon carbide powder product is allowed to cool, e.g., to from about 20° C. to about 100° C.

Boron-containing, submicron beta silicon carbide powder produced by the process described herein can be hot pressed, or cold pressed and sintered to solid shapes having a density of at least 85 percent of theoretical. Preferably, the densified articles have densities of at least 90, e.g., 95 or 98 percent of theoretical. Articles of high density e.g., 96 percent of theoretical, prepared from the aforesaid powder are expected to have the excellent oxidation resistance, hardness, wear resistance, and thermal-shock resistance typical of self-bonded silicon carbide. Flexural strengths in excess of 100,000 pounds per square inch (psi.) have been obtained with sintered rod-like articles of 98 percent of theoretical density and flexural strengths in excess of 60,000 psi. with sintered rectangular articles of 94 percent of theoretical density.

A unique feature of the boron-containing, submicron beta silicon carbide powder described herein is that it can be formed into complex shaped articles by conventional techniques used in the field of ceramics; and, such shapes can be densified to greater than 90 percent of the theoretical density of silicon carbide by vacuum sintering in conventional high temperature furnaces. The surprising ability of the aforesaid silicon carbide powder to be densified to high densities by cold pressing and sintering techniques (pressure-less sintering), i.e., without the simultaneous application of high external pressures and high temperatures, allows the use of this silicon carbide for the preparation of complex shapes such as blades, vanes, etc., without the expensive hot pressing techniques and machining required typically in the part. Naturally, the silicon carbide powder of this invention can be hot pressed to shaped articles of high density — even approaching theoretical density — by conventional hot pressing techniques well known to those skilled in the art.

Any of the conventional techniques used in the field of ceramic forming can be utilized with the above-described silicon carbide powder. These techniques include mechanical die pressing, isostatic pressing, slip casting, extrusion and injection molding. Many of the aforementioned techniques, require the addition of dispersants, lubricants, binders, etc. to the silicon carbide powder. Such additives are well known to persons skilled in the art of ceramic-forming. The shapes produced by conventional techniques have sufficient green strength to allow the shape to be subsequently handled and fired, which may include a pre-firing, to eliminate the aforementioned additives in the high temperature furnace. Typically, the green density of cold formed shapes will be in excess of 50 percent of the theoretical density.

Sintering of the cold formed shapes to high density can be accomplished at a peak sintering temperature between about 1850° C. and 2150° C., e.g., 2100° C. Heating cycles, i.e., the time-temperature schedule during which the shape is heated to and maintained at the peak sintering temperature are conventional and can be determined easily by those skilled in the art by routine experimentation to optimize the temperature-density relationship. Typically, the sintering time at the peak sintering temperature is that time interval which is sufficient to obtain a ceramic article having a density of at least 85 percent, preferably at least 90 or 95 percent and most preferably at least 98 percent of the theoretical density of silicon carbide. Commonly, the heating cycle time interval, i.e., from the start of heat-up to the conclusion of sintering will range between about 4 and about 8 hours. The time at the peak sintering temperature can vary and will depend on the peak temperature used. Generally, the higher the peak temperature, the shorter the time. Care should be taken in limiting the amount of time at peak temperature so as not to induce the beta to alpha crystal transformation and resulting coarsening of the microstructure.

The atmosphere in which shaped articles made of the silicon carbide powder are sintered should be non-oxidizing, i.e., inert, to the silicon carbide shaped articles. Suitable atmospheres include argon, helium, nitrogen, hydrogen, carbon monoxide, mixtures thereof and sub-atmospheric conditions, i.e., a vacuum. Vacuum pressures of less than 50 micrometers of mercury, e.g., less than 30 micrometers of mercury are commonly employed. It has been reported that nitrogen suppresses or retards the beta to alpha crystal transformation of beta silicon carbide. Consequently, a nitrogen sintering atmosphere may be beneficial. The boron-containing, submicron beta silicon carbide powder of the present invention has been sintered in a vacuum furnace at a peak sintering temperature of 2034° C. to a high density while retaining the beta crystalline form as the dominant crystal form, i.e., less than 20 percent of the crystals were of the alpha polytypes. Sintered articles in which the preponderant crystal form is of the alpha polytypes can also be produced. It is reported that, in addition to the sintering atmosphere, the beta to alpha crystal transformation is a function of the temperature and pressure of sintering. See, for example, "The Conversion of Cubic and Hexagonal Silicon Carbide as a Function of Temperature and Pressure", by C. E. Ryan et al., AFCRL-67-0436 (1967), Physical Sciences Research Papers No. 336, pp. 177–197.

The cubic beta phase silicon carbide of which the powders are composed can be largely retained in sintered bodies fabricated from those powders. Such sintered bodies, therefore, may consist of fine equant grains of the beta phase silicon carbide with the coarser elongate platy crystals of alpha phase silicon carbide limited to a content estimated at less than 20 percent. The apparent grain size, i.e., average diameter of the refractory silicon carbide grain as measured on a polished and etched surface of a sintered specimen is extremely fine. As measured on photomicrographs of the polished surface, the grain size of the carbide grains is generally less than ten microns and predominately in the range of about 0.5 to 5 microns. The grains are of relatively uniform size and occur in a microstructure characterized by contiguous grain boundaries and low porosity resulting in high density and strength of the sintered bodies.

The silicon carbide powder described herein can be shaped by conventional ceramic forming techniques and sintered to a high density to provide a variety of articles having high resistance to thermal stress and shock, corrosion resistance to high temperature oxidizing atmospheres and good wear resistance. Such shapes have applications in the field of engineering, ceramic components operating at high temperature and oxidizing atmospheres with varying degrees of stress and such components operating in abrasive environments. Major applications for high temperature use include rocket nozzles, resistance heaters, radiant heater tubes, gas turbine components, e.g., air foils and blades, reciprocating engines, and chemical plant components. For wear-resistance applications, there can be mentioned mechanical seals, bearings and spinnerets. Articles prepared from the submicron silicon carbide powder described herein are particularly applicable for use as components for gas turbines employed for electric power generation and for automotive gas turbine engines.

The present invention is more particularly described in the following examples which are intended as illustrative only since numerous modifications and variations therein will be apparent to those skilled in the art. In the following examples, volumes of hydrogen gas are expressed in cubic feet per hour at standard conditions (14.7 pounds per square inch and 21° C.) or SCFH. Reactant gas stream rates were measured at nominal laboratory conditions, i.e., one atmosphere and 21° C. and are reported as measured if other than SCFH. Unless otherwise specified, all percentages are by weight. Specific reaction conditions recited in the Examples are representative of the operating conditions since flow rates tend to vary with time.

The plasma generator used in the Examples was a medium voltage, medium amperage direct current arc heater having a power input of 28 kilowatts. The arc heater was operated at between 24 and 28 kilowatts and with an efficiency of from about 50 to 75 percent. Hydrogen was used as the plasma gas. The plasma heater was mounted coaxially and vertically atop a reactant inlet mixer assembly having three horizontal reactant inlet conduits in vertical alignment as shown in FIG. 3 of U.S. Pat. No. 3,761,576. The heated hydrogen gas was discharged from the arc heater through the mixer assembly and thence into the reactor. A field coil was positioned around the anode to assist in stabilizing the arc when plasma gas was introduced radially into the region between the anode and the cathode of the plasma heater. The mixer assembly was mounted coaxially atop a reactor vessel.

EXAMPLE I

A direct current plasma arc heater, as described hereinabove, was connected to a source of direct current and an arc struck between a pointed stick cathode and hollow cylindrical anode. The arc heater was operated at about 149 volts and 168 amperes, i.e., about 25.0 kilowatts. Three hundred SCFH of hydrogen plasma gas was introduced radially into the region between the cathode and anode and heated by the arc as it passed through the anode. The field coil around the anode was operated at 48 amps and 21 volts. The hot hydrogen gas stream discharging from the nozzle of the cylindrical anode was passed through the reactant inlet assembly and thence into the reactor vessel.

Vinyl chloride and 45 SCFH hydrogen carrier gas were introduced into the hot hydrogen stream from the top reactant inlet conduit of the reactant inlet mixer assembly. The vinyl chloride was used in an amount calculated to be 25 percent in excess of stoichiometry. Seventy SCFH of hydrogen were introduced into the hot hydrogen stream through the middle conduit of the mixer assembly. 102 millimoles per minute of silicon tetrachloride, 76.2 cc/minute of boron trichloride and 20 SCFH of hydrogen carrier gas were introduced into the hot hydrogen stream through the bottom conduit of the mixer assembly. This represented a nominal rate of 0.5 pound of silicon carbide per hour. During the total period of operation, the rate of production was varied slightly from the 0.5 pound per hour rate and accordingly other reaction conditions also varied slightly; however, the principal rate of production was at the 0.5 pound per hour rate. Arc heater efficiency was calculated at one point in the operation of the equipment to be about 61 percent. Analyses of the product indicated that the level of boron in the silicon carbide product was between 0.34 and about 0.4 weight percent. The silicon carbide product was found to be essentially of the beta crystalline form, have a B.E.T. surface area of about 14 square meters per gram, have a total carbon content of about 30.6 percent and a chlorine content of about 0.06 percent.

EXAMPLE II

A portion of the silicon carbide powder of Example I was isostatically pressed in a ¾ inch diameter × 3 inch length rubber mold at 20,000 pounds per square inch. The compacted rod was approximately ½ inch in diameter by 'inches in length. The compacted rod was sintered in a vacuum furnace at a peak temperature of about 2110° C. Heating time from room temperature to 2,000° C. was 10 hours. The time at temperatures of 2,000° C. and higher was about 45 minutes. The sample was permitted to cool overnight in the furnace and when removed was found to have a density of 3.04 grams/cc or 94.5 percent of the theoretical density of silicon carbide.

EXAMPLE III

Submicron beta silicon carbide powder was prepared following the procedure of Example I except that the rate of silicon tetrachloride was 85 millimole per minute and the rate of boron trichloride was 191 cc/minute. The arc heater power level was 23.5 kilowatts and at one point during the period of operation had a measured efficiency of 61.5 percent. The silicon carbide powder was found to contain from about 1.6 to 1.7 weight percent boron, have a B.E.T. surface area of about 11 square meters per gram, a total carbon cntent of 30.3 percent, and a chlorine content of about 0.07–0.08 percent.

A portion of the silicon carbide powder was used to prepare a sintered rod using the procedure of Example II. Test specimens cut from different ends of the rod were found to have densities of 94 and 84 percent of theoretical. The rod was found to have been poorly packed at the end having the relatively low density.

EXAMPLE IV

Submicron beta silicon carbide powder was prepared following the procedure of Example I except that the rate of silicon tetrachloride was 85 millimoles per minute and the rate of boron trichloride was 145 cc/minute. At various periods during the production run, the rate of silicon tetrachloride was increased to 102 millimoles per minute and the rate of boron trichloride was increased to 174 cc/minute. Arc heater efficiency varied from about 58 to 61 percent; power levels varied from 22 to 25 kilowatts. The silicon carbide powder was found to contain about 0.94 percent boron, have a B.E.T. surface area of 12 square meters per gram, a total carbon content of about 12 square meters per gram, a total carbon content of 30.4 percent and a chlorine content of about 0.07 percent.

A portion of the silicon carbide powder was used to prepare a sintered rod using the procedure of Example II. The rod was found to have a density of about 93.5 percent of theoretical.

EXAMPLE V

Submicron beta silicon carbide powder was prepared following the procedure of Example I except that the arc heater power level was about 30 kilowatts; the hydrogen rate through the top, middle and bottom conduits of the mixer assembly were 85.5, 85.5 and 30 SCFH respectively; the production rate was between 1 and 1.5 pounds of silicon carbide per hour; the vinyl chloride rate was used in an amount between 5 and 15 percent excess; and the boron thrichloride rate was 150 cc/minute and 230 cc/minute at the 1 and 1.5 pound/hour rates. The silicon carbide powder product contained about 0.27 percent boron, as measured by emission spectrographic analysis; had a B.E.T. surface area of 6.6 m$^2$/gram; a total carbon content of 30.6 percent; a free carbon content of 0.85 percent; an oxygen content of 0.17 percent; and a chlorine content of 0.02 percent. The powder was slurried in 1,1,1-trichloroethane solvent, screened through a 400 mesh screen and vacuum dried to remove the solvent. A portion of the powder was isostatically pressed at 20,000 lbs. per square inch in a rubber mold. The resulting green body was sintered in a vacuum furnace for 1 hour at 2100° C. Time to achieve the temperature of 2100° C. was 5½ hours. After being allowed to cool to room temperature, the density of the sintered shape was determined and found to be 98.5 percent of theoretical.

EXAMPLE VI

Submicron beta silicon carbide powder was prepared following the procedure of Example I except that the boron trichloride reactant was omitted; the arc heater power level was about 35 kilowatts; arc heater efficiency varied from 49–60 percent; the field coil was operated at 77 amps; and ethyl chloride was used as the carbon source reactant. Silicon tetrachloride was introduced into the hot hydrogen stream at rates of 490 and 582 millimoles per minute. The corresponding rates for ethylchloride were 6.1 and 7.3 liters per minute. The rate of hydrogen introduction through the top, middle and bottom conduits were 30, 128 and 60 SCFH respectively.

The submicron beta silicon carbide produced had a surface area of about 6.4 square meters per gram; contained less than 0.01 weight percent boron, a total carbon content of 30.2 percent, a free carbon content of 0.73 percent, a chlorine content of 0.02 percent and an oxygen content of 0.11 percent. A portion of this powder was isostatically pressed and sintered in the manner described in Example V. The sintered shape had a density of 57.2 percent of theoretical.

EXAMPLE VII

The submicron beta silicon carbide powders of Examples V and VI were blended in various proportions so that the calculated boron concentration of the blend varied from 0.15 to 0.24 weight percent. The powders were blended for one hour in a polyethylene bottle with tungsten carbide cycloids in order to obtain a homogeneous blend. A portion of each of the blends was isostatically pressed and sintered in a vacuum furnace in the manner described in Example V. Results are tabulated in Table I.

TABLE I

| Blend | % Boron | % Theoretical Density |
|---|---|---|
| A | 0.15 | 83.4 |
| B* | 0.17 | 91.6 |
| C | 0.20 | 96.1 |
| D | 0.24 | 98.0 |

*Blended with polyethylene balls.

The data of Table I show that as little as about 0.15 percent of coformed boron in submicron beta silicon carbide provides a product which can be cold pressed and sintered to densities of about 85 percent of theoretical; and, as little as 0.17 percent of coformed boron is sufficient to obtain a sintered article of at least 90 percent of theoretical density. Further, when the level of coformed boron is in the range of 0.20–0.24 percent, densities in excess of 95, e.g., 96 and 98 percent of theoretical, were obtained.

The data show also that essentially boron-free submicron beta silicon carbide powder can be sintered to high densities by blending with such powder submicron beta silicon carbide containing coformed boron. It is contemplated that from 70 to 10 weight percent, e.g., 55 to 15 weight percent, of substantially boron-free submicron silicon carbide can be blended with from 30 to 90 weight percent, e.g., 45 to 85 weight percent, of submicron silicon carbide containing coformed boron. The amount of coformed boron can vary; but, will be in an amount such that the blend contains boron within the range of 0.15 to 4 weight percent, as described hereinbefore.

EXAMPLE VIII (Comparative Examples)

A series of silicon carbide powders were prepared as detailed hereinafter. Boron carbide ($B_4C$) having a surface area of 10.3 $m^2$/gram was used to prepare boron-containing powders. Each of the powder blends were formulated to have a total carbon content of between 30.4 and 31.6 weight percent and except for Powder F had the equivalent of about 1 weight percent boron carbide.

Powder A

A commercial silicon carbide powder was obtained and classified by settling and decantation in water. The silicon carbide was of the alpha crystalline forms and the classified portion had a B.E.T. surface area of 8.2 square meters per gram. To the sample was added one weight percent of the boron carbide and sufficient carbon black to make the total carbon content of the sample equal 30.4 percent. The boron carbide and carbon were blended with the silicon carbide. The paraffin wax was added to the blend dissolved in 1,1,1,-trichloroethane solvent. After the wax was distributed well on the powder blend, the solvent was evaporated.

Powder B

Submicron silicon carbide powder was prepared by feeding silicon tetrachloride and methane to a hydrogen plasma in accordance with the process described in U.S. Pat. No. 3,340,020. The B.E.T. surface area of the silicon carbide powder product was 51 square meters/gram. To this powder was added one weight percent of boron carbide and sufficient carbon black to make the total carbon content of the sample equal 30.4 percent. The boron carbide, carbon and silicon carbide were blended following the procedure described with respect to Powder A.

Powder C

Submicron beta silicon carbide powder was prepared in accordance with the process described in U.S. Pat. No. 3,271,109. The process described in the aforementioned patent comprises reacting finely-divided silica and carbon black in a flowing inert gaseous atmosphere at temperatures in excess of 1150° C. The silicon carbide powder had a B.E.T. surface area of 1.8 square meters/gram and a total carbon content of 31.6 percent. To the sample was added one weight percent of boron carbide. No additional carbon was added. The paraffin wax added following the procedure described with respect to Powder A.

Powder D

Submicron beta silicon carbide powder was prepared following the procedure of Example I except that the arc heater power level was about 35 kilowatts; the arc heater efficiency was about 48 percent; the field coil was operated at 55 amps; the vinyl chloride, silicon tetrachloride and boron trichloride rates were 5.3 liters/minute, 390 millimoles/minute and 475 cc/minute respectively; and the hydrogen rates through the top, middle and bottom conduits were 120, 171 and 30 SCFH respectively. The aforementioned conditions were representative of the operating conditions used to produce the silicon carbide powder. The silicon carbide powder had a surface area of 8.0 square meters/gram and a total carbon content of 30.7 percent. The boron content was 0.58 percent. To this sample was added 0.5 weight percent of boron carbide. No additional carbon was added. The paraffin wax was added following the procedure described with respect to Powder A.

Powder E

Submicron beta silicon carbide powder was produced following the procedure of Example VI. The silicon carbide powder has a surface area of 10.1 square meters per gram and a total carbon content of 30.7 percent. To this sample was added one weight percent boron carbide. No additional carbon was added. The paraffin wax was added following the procedure described with respect to Powder A.

Powder F

A portion of Powder E was used with no addition of boron carbide.

Each of the aforementioned powders was blended with about 2 weight percent of paraffin wax (unless otherwise noted) as described and cold pressed at 15,000 pounds per square inch in a mechanical press to a sufficient green strength to be handled. Unless otherwise indicated, the articles were sintered in a vacuum furnace at about 2,000° C. for one-half hour. Heat up time to 2,000° C. was about 4½ hours. After cooling, the densities of the sintered shapes were determined. The densities appear in Table II.

TABLE II

| Powder | % Theoretical Density Average Values | Comment |
|---|---|---|
| A | 71 | |
| B | 83 | |
| C | 55.5 | 5% wax added, Peak Temp. = 1960° C. |
| D | 91 | |
| E | 93.7 | Peak Temp. = 1960° C. |
| F | 55.8 | Peak Temp. = 1965° C. |

The data of Table II show that only submicron silicon carbide prepared by the process described herein and formulated to contain boron are densified to greater than 90 percent of theoretical by cold forming and sintering techniques.

EXAMPLE IX

Submicron beta silicon carbide powder was prepared following the procedure of Example I except: the arc heater power was 35 kilowatts, the arc heater efficiency was in the range of 56–58 percent, the field coil was operated at 77 amps, and ethyl chloride was used as the carbon source. The rate of ethyl chloride, silicon tetrachloride and boron trichloride were 4.9 liters/minute, 350 millimoles/minute and 475 cc/minute respectively. The hydrogen flow rates through the top, middle and bottom conduits of the mixer assembly were 60, 200 and 15 SCFH respectively.

Boron-containing, submicron beta silicon carbide powder prepared as described was washed with water and screened through a 400 mesh screen. The powder had a B.E.T. surface area of 8.7 square meters/gram, a total carbon content of 30.4 percent, a free carbon content of 0.93 percent, an oxygen content of 0.28 percent, and a boron content of 0.36 percent.

A portion of the powder was hot pressed into a disc shape at 2,000° C. and 3,000 pounds per square inch. The density of the disc was found to be 97.3 percent of theoretical.

A portion of this powder was blended with 3 weight percent of paraffin wax to improve green strength and cold pressed with a mechanical press (5 tons pressure) into a 2 inch × 2 inch × ¼ inch plate. The plate was sintered at 2,100° C. for 1 hour. Time to reach 2,100° C. was 4 hours. The sintered plate had a density of 97.4 percent of theoretical.

The data of Example IX show that the boron-containing, submicron beta silicon carbide of the present invention can be cold pressed and sintered or hot pressed to high densities, e.g., 97 percent of theoretical.

Example X

Submicron beta silicon carbide powder was prepared following the procedure described with respect to Powder D of Example VIII. The surface area of the powder was 7.2 square meters/gram, the total carbon content was 30.6 percent, the free carbon content was 1.4 percent, the oxygen content was 0.27 percent, and the boron content was 0.52 percent. The powder was slurried in 1,1,1-trichloroethane, screened through a 400 mesh screen and dried.

A portion of the powder was blended in a Sigma mixer with paraffin wax. The blend, which was 55 percent by volume silicon carbide powder and 45 percent by volume wax, was injection molded into a small ring. The ring was sintered at 2,000° C. for 10 minutes. Time to reach 2,000° C. was 5-½ hours. The sintered ring was found to have a density of 97 percent.

A portion of the powder-wax blend was injection molded into a small turbine blade about 1 inch high and sintered at 1932° C. Time to reach 1932° C. was 8 hours. The blade was found to have a density of 90 percent of theoretical.

The data of this Example show that both simple and complex shapes can be produced using conventional ceramic cold forming techniques, e.g., injection molding, with the silicon carbide powder of this invention, and the green shapes thus formed sintered to a high density, e.g., 90 percent of theoretical.

Although the present process has been described with reference to specific details of certain embodiments thereof, it is not intended that such details should be regarded as limitations upon the scope of the invention except as and to the extent that they are included in the accompanying claims.

I claim:

1. A process for preparing boron doped submicron beta silicon carbide powder having from traces to less than one weight percent alpha silicon carbide, capable of being pressure-less sintered to articles having a density of at least 85 percent of the theoretical density for silicon carbide, by gas phase reaction of silicon, boron and carbon source reactants in the presence of hydrogen in a reactor, which comprises projecting a hot stream of hydrogen produced by heating hydrogen in hydrogen plasma generating means into a reaction zone in a recirculating-type reactor, introducing gaseous silane, boron source and halogenated hydrocarbon source reactants into said reaction zone, said boron source reactant being present in amount sufficient to provide between 0.15 and 4 weight percent boron in the silicon carbide powder, the halogenated hydrocarbon source reactant being present in an amount sufficient to provide between 0.05 and 1.5 weight percent free carbon in the silicon carbide powder, and the heat content of the hot hydrogen stream and the reactants being sufficient to establish beta silicon carbide forming temperatures in said reaction zone, reacting said silane, boron source and halogenated hydrocarbon source reactants in the reaction zone in the presence of an excess of the theoretical demand for hydrogen, the apparent residence time of the reactants in the reactor being between about 0.05 and about 0.5 seconds, and removing said solid boron doped submicron beta silicon carbide powder having a surface area of between 3 and 15 square meters per gram from the reactor, at least 90 percent of the silicon carbide particles having an equivalent spherical diameter less than one micron.

2. The process of claim 1 wherein the silane reactant is silicon tetrachloride and the boron source reactant is boron trichloride.

3. The process of claim 2 wherein the halogenated hydrocarbon source reactant is halogenated hydrocarbon containing from 1 to 12 carbon atoms.

4. The process of claim 2 wherein the principal source of heat for the reaction is the heated hydrogen gas stream and wherein the principal reaction zone temperature is between 2500° C. and 3500° C.

5. The process of claim 1 wherein the silane reactant is silicon tetrachloride, the boron source reactant is boron trichloride, the carbon source reactant is halogenated hydrocarbon containing from 1 to 8 carbon atoms, the mole ratio of hydrogen to silane reactant in the reactor is between about 20 and 40, and the silicon carbide powder removed from the reactor has a surface area of between 4 and 12 square meters per gram.

6. The process of claim 5 wherein the silicon carbide powder is capable of being pressure-less sintered to articles having a density of at least 90 percent of the theoretical density for silicon carbide and the boron source reactant is present in amount sufficient to provide between 0.17 and 4 weight percent boron in the silicon carbide powder.

7. A process for preparing boron doped submicron beta silicon carbide powder having from traces to less than one weight percent alpha silicon carbide by gas phase reaction of silicon, boron and carbon source reactants in the presence of hydrogen in a reactor, which comprises projecting a hot stream of hydrogen produced by heating hydrogen in hydrogen plasma generating means into a reaction zone in a recirculating-type reactor, introducing gaseous silane, boron source and carbon source reactant selected from the group consisting of hydrocarbons and halogenated hydrocarbons that are readily volatile at the gas phase reaction temperature into said reaction zone, said boron source reactant being present in amount sufficient to provide between 0.15 and 4 weight percent boron in the silicon carbide powder, the carbon source reactant being present in an amount sufficient to provide between 0.05 and 1.5 weight percent free carbon in the silicon carbide powder, and the heat content of the hot hydrogen stream and the reactants being sufficient to establish beta silicon carbide forming temperatures in said reaction zone, reacting said silane, boron source and carbon source reactants in the reaction zone in the presence of an excess of the theoretical demand for hydrogen, the apparent residence time of the reactants in the reactor being between about 0.05 and about 0.5 seconds, withdrawing from the reactor a reactor effluent comprising a gaseous suspension of solid silicon carbide particles, and separating from said reactor effluent solid boron doped submicron beta silicon carbide powder having from traces to less than one weight percent alpha silicon carbide, at least 90 percent of the silicon carbide particles having an equivalent spherical diameter less than one micron, which beta silicon carbide powder is capable of being pressureless sintered to articles having a density of at least 85 percent of the theoretical density for silicon carbide.

8. The process of claim 7 wherein the silane reactant is silicon tetrachloride, the boron source reactant is boron trichloride, and the carbon source reactant contains from 1 to 12 carbon atoms..

9. The process of claim 7 wherein the boron doped submicron beta silicon carbide powder has a surface area of between 3 and 15 square meters per gram.

10. The process of claim 7 wherein the principal source of heat for the reaction is the heated hydrogen gas stream and the principal reaction zone temperature is between 2500° C. and 3500° C.

11. The process of claim 8 wherein the mole ratio of hydrogen to silane reactant in the reactor is between about 20 and 40, and the silicon carbide powder separated from the reactor effluent has a surface area of between 4 and 12 square meters per gram.

* * * * *